(12) United States Patent
Kloper et al.

(10) Patent No.: US 6,941,110 B2
(45) Date of Patent: Sep. 6, 2005

(54) MITIGATING INTERFERENCE WITH FREQUENCY HOPPING SIGNALS BY DERIVING FUTURE HOP FREQUENCIES

(75) Inventors: David S. Kloper, Mt. Airy, MD (US); Neil R. Diener, Rockville, MD (US)

(73) Assignee: Cognio, Inc., Germantown, MD (US)

( * ) Notice: Subject to any disclaimer, the term of this patent is extended or adjusted under 35 U.S.C. 154(b) by 57 days.

(21) Appl. No.: 10/707,790

(22) Filed: Jan. 13, 2004

(65) Prior Publication Data

US 2004/0137849 A1 Jul. 15, 2004

Related U.S. Application Data

(60) Provisional application No. 60/319,865, filed on Jan. 14, 2003.

(51) Int. Cl.[7] .......................... H04B 17/00; H04B 1/00; H04B 1/69; H04B 1/707; H04B 1/713
(52) U.S. Cl. .................. 455/67.11; 455/63.1; 455/502; 375/132; 375/134; 375/137
(58) Field of Search ............................... 455/502, 63.1, 455/67.11, 41.2; 375/132, 133, 134, 137

(56) References Cited

U.S. PATENT DOCUMENTS

| | | | |
|---|---|---|---|
| 5,574,979 A | 11/1996 | West | |
| 6,052,406 A | 4/2000 | Epstein et al. | 375/202 |
| 6,256,478 B1 | 7/2001 | Allen et al. | |
| 6,349,198 B1 | 2/2002 | Carlson et al. | |
| 6,359,924 B1 * | 3/2002 | Kuhn et al. | 375/132 |
| 6,374,082 B1 | 4/2002 | Carlson | |
| 6,549,784 B1 * | 4/2003 | Kostic et al. | 455/501 |
| 6,859,450 B1 * | 2/2005 | Mansfield | 370/344 |
| 2002/0085622 A1 * | 7/2002 | Dhar et al. | 375/132 |
| 2003/0108008 A1 * | 6/2003 | Agrawal et al. | 370/332 |

OTHER PUBLICATIONS

Stephens et al, "A Self–Synchronizing Technique Providing Secure Messaging in Wireless Communication Systems," 2003, Robert Gold Comm Systems, Inc.
Air Force Research Laboratory, "Success Story: Sensors Directorate Develops Countermeasures Against Frequency Agile Signals," publication date unknown.

* cited by examiner

*Primary Examiner*—Vivian Chin
*Assistant Examiner*—Raymond B. Persino
(74) *Attorney, Agent, or Firm*—Edell, Shapiro & Finnan

(57) ABSTRACT

Techniques to avoid interference with a frequency hopping signal that are of a periodic or quasi-periodic nature that may operate in the same frequency band and proximity with other devices. For example, the frequency hopping signals may be transmitted by Bluetooth devices operating in the same frequency band as IEEE 802.11 WLAN devices. When a frequency hopping interfering signal is detected, sufficient knowledge of the frequency hopping sequence is derived without obtaining state of a frequency hop sequence from information carried in the frequency hopping signal. This knowledge is used to predict or determine when future transmissions of the frequency hopping signal will be present in a particular frequency channel of concern. Using knowledge of future hop frequencies, operating parameters of a communication device or network can be adjusted to mitigate interference with the frequency hopping signal only at times when the frequency hopping signal will be in a particular frequency channel or channels of interest.

45 Claims, 6 Drawing Sheets

MITIGATING INTERFERENCE WITH FREQUENCY HOPPING SIGNALS BY DERIVING FUTURE HOP FREQUENCIES

This application claims priority to U.S. Provisional Application No. 60/319,865 filed Jan. 14, 2003, the entirety of which is incorporated herein by reference.

BACKGROUND OF INVENTION

The present invention is directed to wireless communication applications, and more particularly, to techniques to synchronize to frequency hopping interfering signals in order avoid interference with such interferers.

In wireless networks, particularly short-range wireless networks such as IEEE 802.11 wireless local area networks (WLANs), the radio frequency band in which the wireless network operates is a frequency band that is shared with other wireless applications. For example, an IEEE 802.11 WLAN operates in either the 2.4 GHz unlicensed band or one of the 5 GHz unlicensed bands in the U.S. Other non-IEEE 802.11 WLAN devices operate in these frequency bands, including devices that operate in accordance with the Bluetooth™ protocol (in the 2.4 GHz band), cordless telephones (in the 2.4 and 5 GHz bands), microwave ovens, infant monitors, radar, etc. To the 802.11 WLAN devices, these other devices may be viewed as interferers. Some of interferer devices transmit signals that hop to different center frequencies throughout the frequency band on a periodic or quasi-periodic basis. When transmissions of WLAN devices overlap in frequency and time with transmissions from interferer devices, the WLAN device may suffer complete loss of signal, reduced signal quality and/or decreased throughput. Likewise, the interferer devices may suffer similar problems.

Co-pending and commonly assigned U.S. application Ser. No. 10/248,434, filed Jan. 20, 2003, entitled "Systems and Methods for Interference Mitigation with Respect to Periodic Interferers in Short-Range Wireless Applications," discloses techniques to detect and synchronize to a periodic interferer, and to share with other devices information about a local interferer at a particular device. These techniques are useful to schedule transmissions so as to avoid the interferer only during times when it can be predicted that the interfering signal will occur in the future, but assumes that all future occurrences of the interferer, even a frequency hopping interferer, fall within a particular frequency channel of concern. It would be further desirable to be able to predict future hop frequencies of frequency hopping signals in order to schedule transmissions to avoid the frequency hopping signals only when the future hop frequencies will fall within a particular frequency bandwidth (e.g., a channel or channels).

SUMMARY OF INVENTION

Briefly, techniques are provided to avoid interference with a frequency hopping signal that are of a periodic or quasi-periodic nature that may operate in the same frequency band and proximity with other devices. For example, the frequency hopping signals may be transmitted by Bluetooth devices operating in the same frequency band as IEEE 802.11 WLAN devices. When a frequency hopping interfering signal is detected, sufficient knowledge of the frequency hopping sequence is derived without obtaining state of a frequency hop sequence from information carried in the frequency hopping signal. This knowledge is used to predict or determine when future transmissions of the frequency hopping signal will be present in a particular frequency channel of concern. Depending on the type of frequency hopping signal, at least a partial solution for the inputs to the frequency hop selection algorithm may be solved for by examining center frequency and time of occurrence data accumulated over time for received transmissions of the frequency hopping signal. This partial solution is then used to determine future transmission frequencies of the frequency hopping signal for at least a portion of a limited future time interval. Using knowledge of future hop frequencies, operating parameters of a communication device or network can be adjusted to mitigate interference with the frequency hopping signal. This technique has the advantage of adjusting operating parameters of the device or network only at times when the frequency hopping signal will be in a particular frequency channel or channels of interest.

The above and other objects and advantages of the invention will become more readily apparent when reference is made to the following description taken in conjunction with the accompanying drawings.

DETAILED DESCRIPTION

Figure 1:
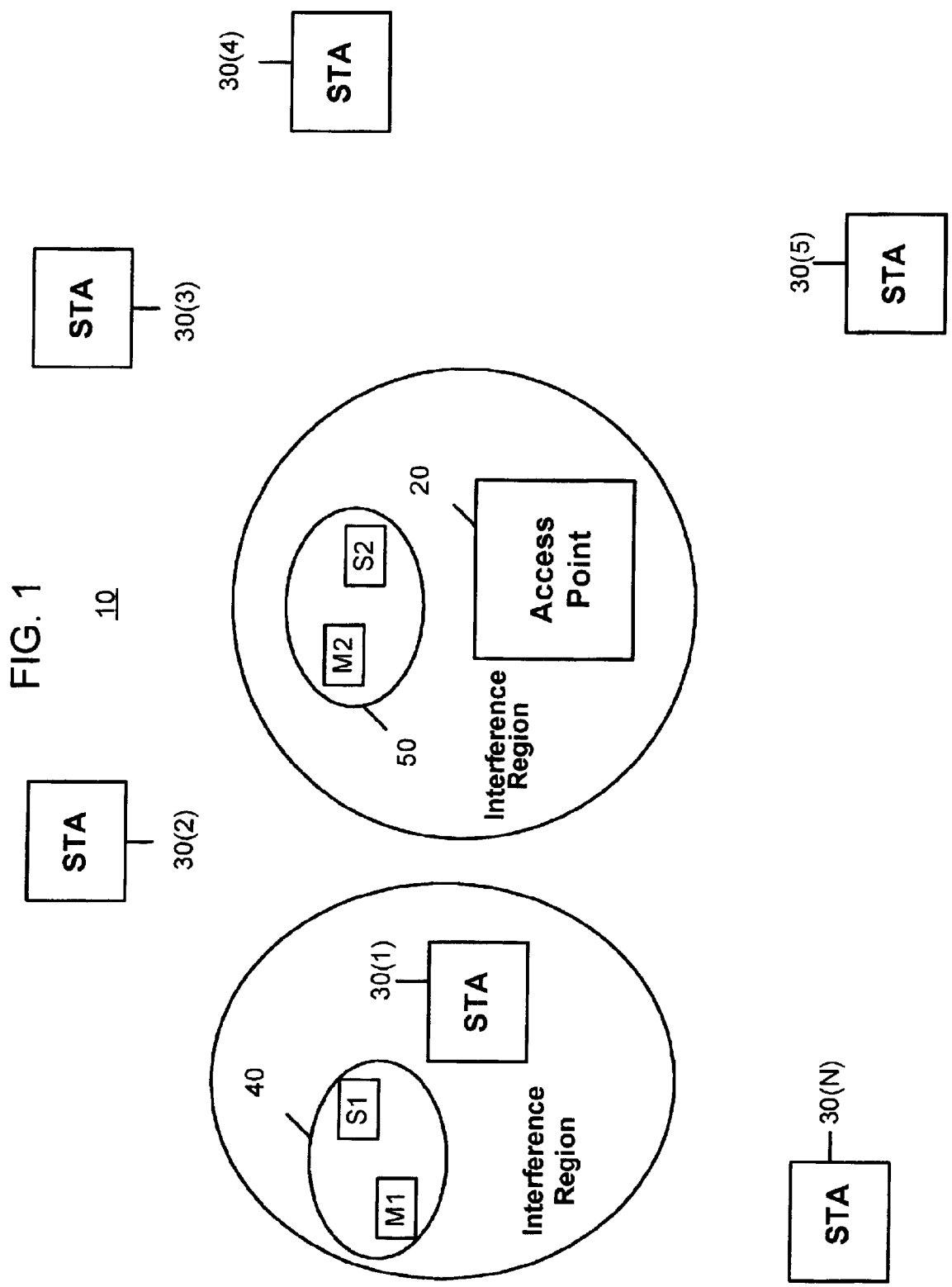
FIG. 1 is a block diagram illustrating interference situations in a wireless local area network (WLAN).

FIG. 1 shows an example of a wireless network environment having a fixed terminal and a plurality of remote terminals. An example of such an environment is an IEEE 802.11 wireless local area network (WLAN) 10 comprising an access point (AP) 20 and several associated stations (STAs) 30(1) to 30(N). If the WLAN is operating in an environment where other non-WLAN devices are operating, then those non-WLAN devices may interfere with operation of the WLAN. An example of a potentially interfering device that transmits on a periodic or quasi-periodic basis is a Bluetooth device (e.g., a Bluetooth headset), a cordless telephone device, etc. The WLAN devices and the other devices may be operating in an unlicensed frequency band, such as the 2.4 GHz band or one of the 5 GHz bands in the U.S. In FIG. 1, interferers are shown at reference numerals 40 and 50, respectively. A Bluetooth network may consist of a master device M1 and a slave device S1, in the case of the interferer shown at reference numeral 40 and a master device M2 and a slave device S2 in the case of the interferer shown at reference numeral 50. Rather than Bluetooth devices, these devices may be frequency hopping wireless cordless phone devices, where the master is the base unit and the slave in the remote handset unit. The exemplary interfering devices may transmit periodically or quasi-periodically. Some interfering devices may hop to different frequencies based on a hopping sequence. For example, a Bluetooth device hops to different frequencies based on a pseudo-random mathematical process.

Due to its location and other factors, interferer 40 may interfere with only one station, such as STA 30(1), but not any other device in the WLAN 10. This may be a very common scenario because the range of a Bluetooth headset device, for example, is minimal compared to the possible locations of other STAs in the WLAN 10. On the other hand, interferer 50 may interfere only with the AP 20, but not directly with any one of the STAs. It is also possible that an interferer may cause interference at the AP 20 and at one or more or all of the STAs 30(1) to 30(N). Of course, when the AP 20 is interfered with, the entire WLAN for that AP is affected. The aforementioned co-pending and commonly assigned U.S. application Ser. No. 10/248,434, filed Jan. 20, 2003, discloses techniques to avoid interference with a periodic signal. The entirety of this prior application is incorporated herein by reference. Those techniques do not take advantage of the fact that the periodic signal is not always in the frequency channel of interest, such as one or more channels of a WLAN that are used by the AP 20 in communication with the STAs. In fact, if the non-WLAN signal is a frequency hopping signal, it will be present at any particular frequency only for a relatively short time interval. If transmissions in the WLAN are scheduled around a periodic or quasi-periodic frequency hopping signal, then the loss of throughput in the WLAN can be minimized if the WLAN transmissions are deferred only when the frequency hopping signal will in fact be in the frequency band or bands of operation of the WLAN.

The term "quasi-periodic" is meant to include a signal that is for some periods of time, periodic in nature, and during other periods of time, a periodic, as well as signals that are not precisely periodic, but their repetitive occurrence can be predicted within a tolerance that is sufficient for scheduling other signals so as to avoid colliding with them. For example, if a frequency hopping signal hops across a broad frequency band, but a communication device can observe only part of that frequency band, then even if the frequency hopping signal is periodic, that communication device will not observe it to be periodic.

While this description refers to frequency hopping signals transmitted consistent with the Bluetooth communication standard, it should be understood that the techniques described herein are useful for a situation where a frequency hopping signal of any communication standard (whose hop sequence can be derived without obtaining state information from information carried in the frequency hopping signal) may interfere (e.g., overlap in frequency and time) with signals transmitted by other devices.

Figure 2:
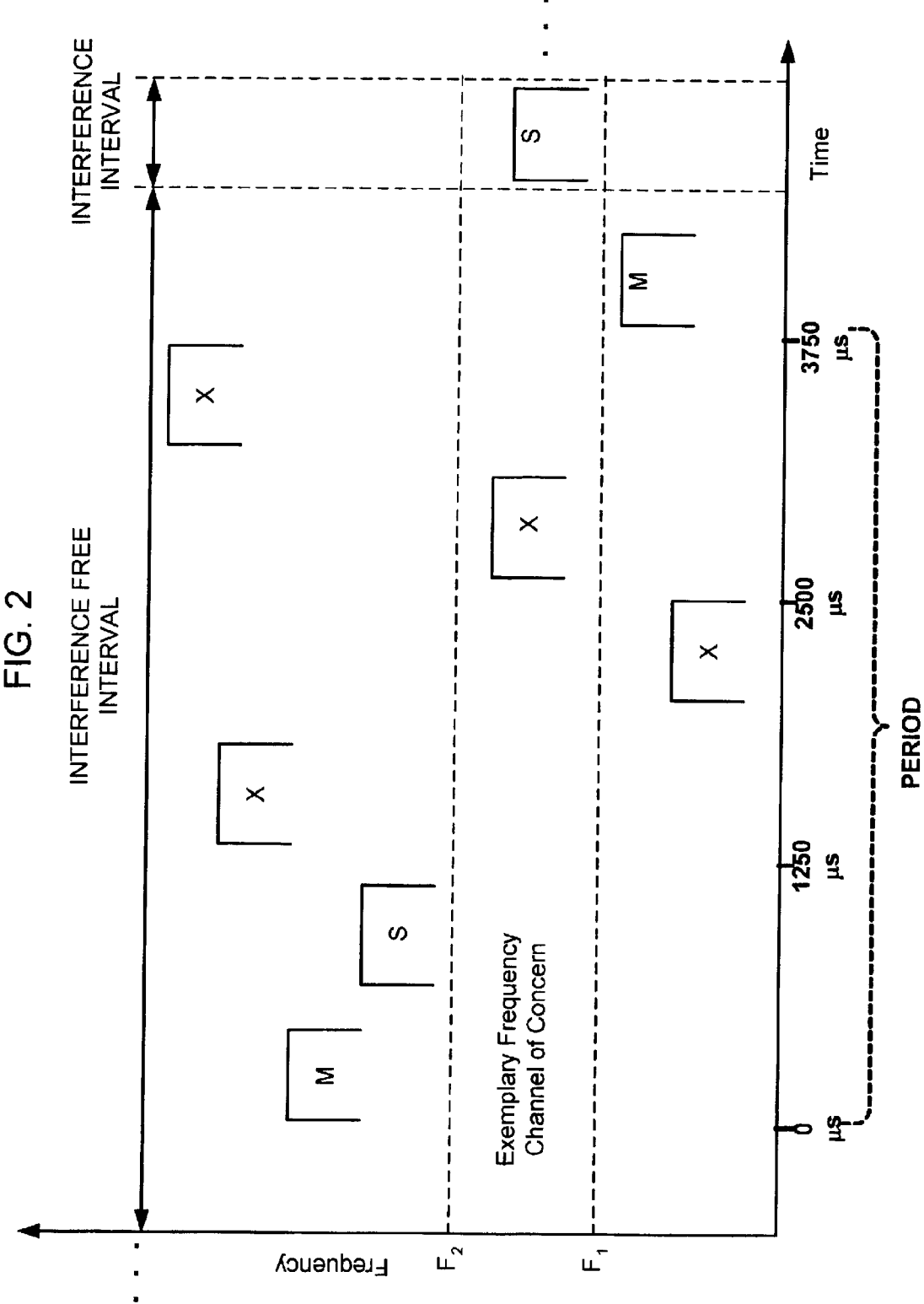
FIG. 2 is a frequency versus time diagram of an exemplary frequency hopping signal and illustrating the basics of the technique to avoid interference with the frequency hopping signal.

FIG. 2 illustrates the behavior of a Bluetooth SCO signal as an exemplary frequency hopping signal. There is a master signal pulse waveform (M) transmitted from a master device followed very closely and precisely in time by a slave signal pulse waveform (S) transmitted by a slave device. A predetermined period of time after the beginning of the master signal M, another master-slave signal exchange occurs. Thus, the M-S signal exchange exhibits a periodic behavior. As shown in FIG. 2, the master and slave signals are transmitted at frequencies selected from a randomly generated sequence, which in the case of the Bluetooth protocol, is a pseudo-random sequence. A Bluetooth signal can be identified by various attributes using statistical methods without requiring a Bluetooth sync detector or demodulator. Although the pseudo-random hop sequence used by the Bluetooth standard repeats approximately once every 23 hours, with a modest amount of data and processing resources, the frequency hop sequence can be cracked or derived sufficiently to provide increasing periods of synchronization (knowledge of hop frequencies and times of occurrence for transmissions over a future time interval). This can even be accomplished with a limited window of visibility into the 79 MHz band used by Bluetooth in the United States. For example, a communication device may view 20 MHz of that bandwidth if it operates according to an IEEE 802.11 standard and therefore not detect certain hops because they are outside the bandwidth of the radio in that device.

The frequency hopping signal will occur in a particular frequency bandwidth, e.g., a particular frequency channel at any given occurrence, such as the frequency channel that spans frequencies $F_1$ to $F_2$ as shown in FIG. 2. FIG. 2 shows an example wherein during a second M-S exchange, the slave transmission occurs in the frequency channel of concern or interest. It should be understood that it is just as likely that any master and slave transmission could occur in the frequency channel of concern. By using this knowledge of when a Bluetooth device will be operating in a particular channel of a transmitter for another protocol (e.g., an 802.11b channel), it is possible to limit the expected interference events to reduce the reserved bandwidth. It should also be understood that the M-S signals shown in FIG. 2 occupy assigned time slots and that in the time period between the first M-S signal exchange, there are other time slots (e.g., 4 slots) that may be occupied by other traffic such as other Bluetooth SCO traffic or Bluetooth ACL traffic. According to the Bluetooth standard, for one variant of Bluetooth SCO traffic that is popular in headset devices, only 2 out of 6 time slots are occupied by SCO traffic. Therefore, as indicated by time slots X shown in FIG. 2, other time slots may contain other traffic at frequencies which also may fall within a particular channel(s) of concern.

Figure 3:
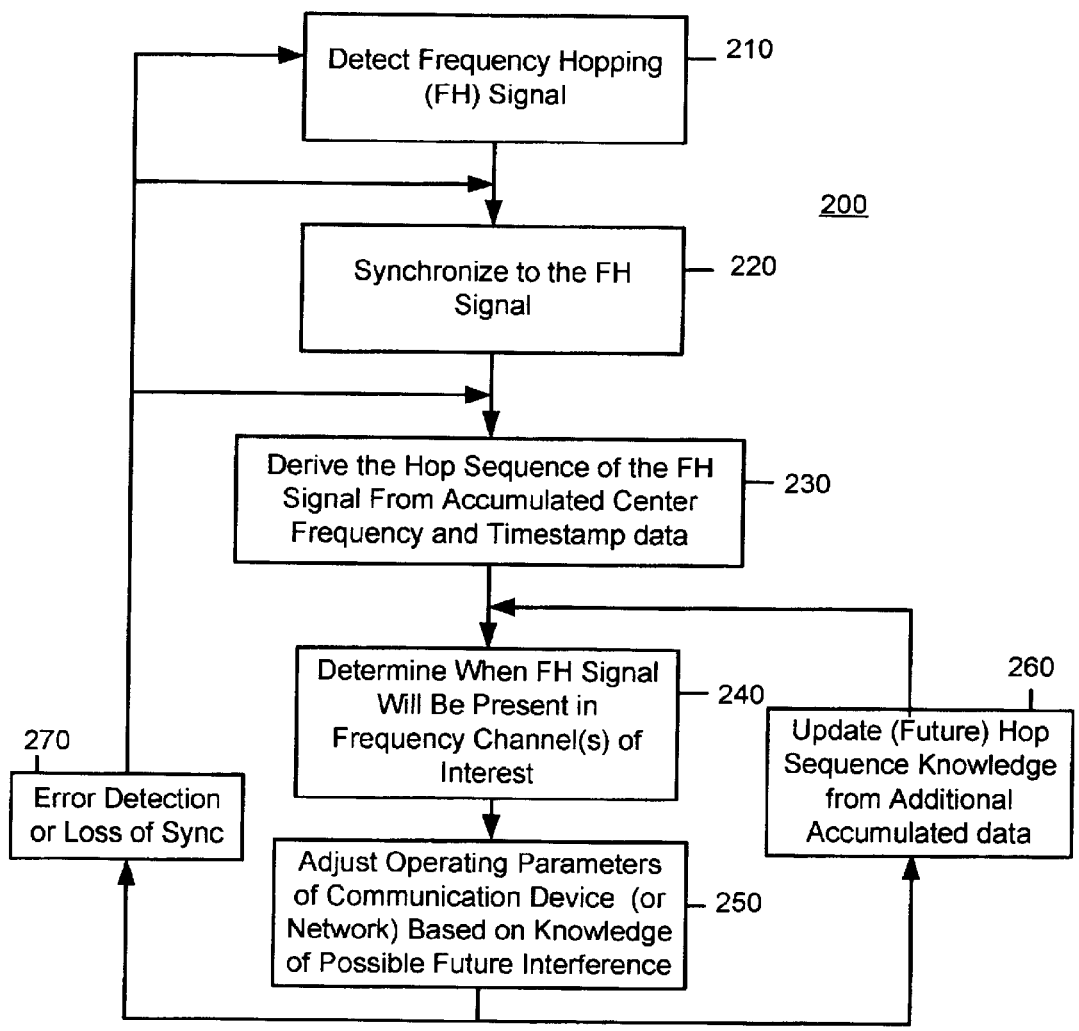
FIG. 3 is a flow chart of a technique to avoid interference with the frequency hopping signal when it will be present in a particular frequency channel or channels.

FIG. 3 shows a process 200 for scheduling transmissions around a frequency hopping signal that would otherwise interfere with transmissions of another device or network of devices. This process may be implemented by software executed by a processor, or by firmware or hardware. In step 210, a device, such as a STA or AP, detects the frequency hopping (frequency hopping) signal. In addition, in step 210, data pertaining to the time of occurrence and center frequency of received transmission of the frequency hopping signal is stored (and accumulated). Next, in step 220, the device synchronizes (in time) to the frequency hopping signal in order to ascertain that it is a frequency hopping signal of a known type and whose frequency hopping sequence can be at least partially derived for future hops. The process of step 220 may be implemented using the techniques described in aforementioned co-pending and commonly assigned U.S. application Ser. No. 10/248,434. In addition, techniques may be employed in step 220 for identifying/classifying signals based on time and frequency characteristics as disclosed in co-pending and commonly assigned U.S. application Ser. No. 10/246,364, filed Sep. 18, 2002, entitled "System and Method for Signal Classification of Signals in a Frequency Band; "U.S. application Ser. No. 10/420,362, filed Apr. 22, 2003, entitled "System and Method for Classifying Signals Occurring in a Frequency Band;" and U.S. application Ser. No. 10/628,603, filed Jul. 28, 2003, entitled "System and Method for Classifying Signals Using Timing Templates, Power Templates and Other Techniques." The entirety of each of these applications is incorporated herein by reference.

A device may perform steps 210 and 220 when viewing all, a substantial part or a small part of the frequency band in which the frequency hopping signals hops. In addition, it is possible that due to channel conditions, interference, and/or receiver sensitivity, a device may not detect all hops (pulses) of a frequency hopping signal even within the bandwidth of its radio receiver. In such a case, the device may receive a subset of radio transmissions of the frequency hopping signal over time. However, the frequency hop prediction/derivation algorithm described hereinafter will still be able to derive future hop frequencies. In step 230, at least a part of a solution for an input (or related intermediate values) to the frequency hopping sequence of the frequency hopping signal is derived to compute frequencies (and times) for future transmissions of the frequency hopping signal over at least a portion of a limited future time interval, if not a longer period of time. The hop sequence cracking/derivation technique that is used depends on the type of frequency hopping signal protocol, and knowledge of the type of frequency hopping signal (determined in step 220) is useful to apply the appropriate algorithm to derive a solution for its frequency hopping sequence. There may be several techniques suitable to derive a solution for a frequency hopping sequence for a given frequency hopping signal type. When the frequency hopping sequence is derived, then in step 240, it can be determined when in the future the frequency hopping signal will occur in a particular frequency bandwidth (e.g., particular channel or channels) in a frequency band.

Given knowledge of possible future interference with the frequency hopping signal, in step 250, one or more operating parameters of a communication device, or network of communication devices, are adjusted to mitigate interference with (or other deal with) the frequency hopping signal. Examples of the types of operating parameters that may be adjusted include one or more of: a (start) time of transmission, a transmission frequency (channel), a transmission data rate, a packet size for transmission (or corresponding fragmentation threshold), a transmission duration, a transmit power, a modulation scheme, and an encoding scheme. Adjusting the time of transmission may involve advancing in time or delaying in time the start of a transmission. In addition, the transmission may be delayed or advanced in such a manner to avoid the frequency hopping signal and to ensure that a reply or acknowledge transmission from another (destination) device will also occur at such a time as to avoid the frequency hopping signal. In some cases, the ability to switch to a different channel for a particular transmission may be suitable to avoid interfering with the frequency hopping signal. The transmit power of a signal may be increased or decreased, depending on a desired impact with respect to a collision with the frequency hopping signal. The data rate and/or size of a packet to be transmitted may be adjusted so as to ensure that the packet can be completely transmitted within a time window to avoid interfering with the frequency hopping signal. In addition, it may be useful to adjust or change the modulation scheme and/or encoding scheme for a transmission to mitigate the effects of an eventually and otherwise unavoidable interference with the frequency hopping signal.

In addition, the step of adjusting an operating parameter may be performed during a time interval when a future transmission of the frequency hopping signal may be expected to occur within a particular frequency bandwidth (channel or channels), even if it is not known for certain because a future transmission slot may not be utilized or the precise transmission frequency for a time slot could not be derived. On the other hand, the step of adjusting an operating parameter may be performed only during a time interval a future transmission of the frequency hopping will be known to occur within a particular frequency bandwidth (channel or channels).

For some frequency hopping signals, the hop sequence may be updated after a certain period of time as shown by step 260, in order to derive the sequence for additional future time windows of transmissions of the frequency hopping signal. In addition, though not shown in step 260, adjustments may be made for clock drifts between the clock of the interfering signal(s) and the clock of the device detecting that signal(s). If the hop sequence is lost or some other error in the synchronization occurs as shown at step 270, the process can revert back to step 210, 220 or 230. For example, the process may revert to interference scheduling techniques (in step 220) that assume all hops of the frequency hopping signal will occur in the frequency channel (s) of concern.

Other enhancements that may be applied to the interference avoidance process 200 are disclosed in the aforementioned co-pending U.S. application Ser. No. 10/248,434. For example, this prior application disclosed techniques to manage issued related to clock drift between the affected device and the frequency hopping signal, and clock drift between the affected device and other devices. In addition, information about the frequency hopping interferer may be shared by the affected device with another device that is not directly affected by the frequency hopping signal. For example, a first device, a STA (called the affected STA), may receive the frequency hopping transmissions and derive the frequencies and times for future transmissions and send information via a message to the second device, an AP, to enable the second device to adjust an operating parameter. Thus, in the context of FIG. 3, steps 210–240 may be performed at the STA, and step 250 may be performed at the AP. The AP may use this information to control when it schedules transmissions of a signal to that affected STA. Of course, the affected STA will use that information to determine when to transmit to the AP. It is possible that the AP may track multiple different interferers from different or the same STAs, and that any given STA may track multiple different interferers. Conversely, if the AP is affected by a frequency hopping interfering signal and has derived future hop frequencies of that signal, the AP will use that information to control when it transmits a signal to any STA, and similarly when it broadcasts a signal to a plurality of STAs.

Turning to FIGS. 4–7, a procedure for determining the hop frequencies of future transmissions of Bluetooth SCO pulses will be described. While the foregoing procedure is described with respect to determining the expected frequencies of future Bluetooth signals, it should be understood that it may be applicable to determining the expected frequencies of other frequency hopping signals that follow a pseudo-random or other type of frequency hop selection process. This procedure involves receiving radio transmissions of a frequency hopping signal; storing and accumulating data pertaining to time of occurrence and center frequency for received transmissions of the frequency hopping signal over time; and deriving, based on the data, future transmissions frequencies of the frequency hopping signal without obtaining state of a frequency hop sequence from information carried in the frequency hopping signal. Normally, a device that has the capability of fully processing the frequency hopping signal obtains state of the frequency hopping sequence from information carried in the frequency hopping signal according to the applicable protocol, such as in a field of a frame of packet that the device recovers after demodulation of the received signal and decoding of the recovered data. The frequency hop derivation technique describe herein does not require the capability to process the frequency hopping signal in that manner.

Figure 4:
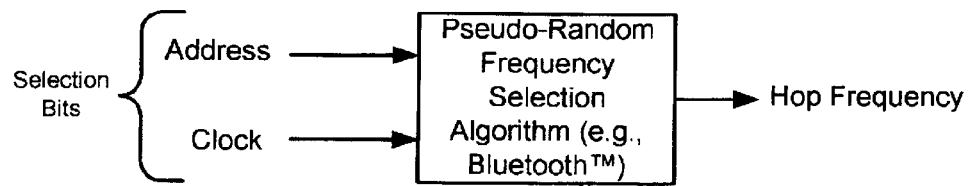
FIG. 4 is a block diagram showing how a frequency is selected for a frequency hopping signal using a pseudo-random hop selection sequence.

FIG. 4 generally shows a pseudo-random frequency selection algorithm 400 that generates a hop frequency from Address and Clock bits. For example, in the case of a Bluetooth SCO signal, the Address bits may be associated with the address of one of the devices, e.g., the address of a Bluetooth master when the master and slave devices are in the Connection state. The Clock bits are derived from the bits associated with a native clock that may be modified to equal the master clock. Only a portion of the master clock may be used for the Clock bits input to the frequency selection algorithm. The output of the frequency selection algorithm is a frequency hop sequence that is pseudo-random and covers a predetermined number of hops, e.g., 79 hops or 23 hops, in the case of the Bluetooth protocol. For other types of frequency hopping signals, the inputs to the frequency selection process may be different.

Figure 5:
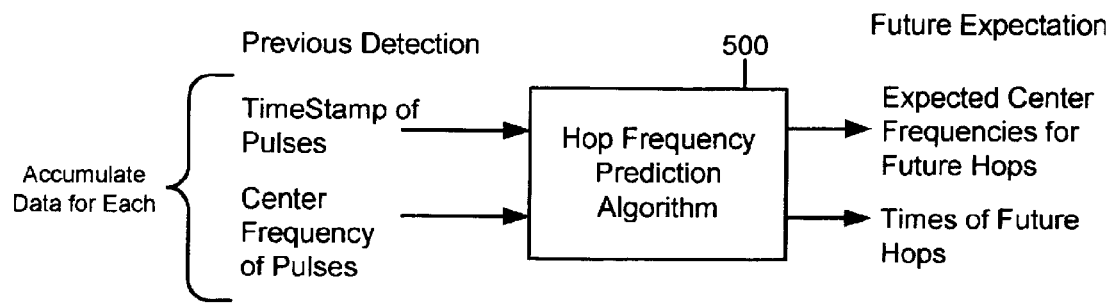
FIG. 5 is a block diagram generally showing how time of occurrence and frequency of transmission of a received frequency hopping signal are used to determine future hop frequencies of a frequency hopping signal.

FIG. 5 generally shows a hop frequency prediction or derivation algorithm 500 (that corresponds to the processing of step 230 in FIG. 3) that determines the expected center frequencies and time of occurrence for future hops of the frequency hopping signal from timestamp (TS) and center frequency (CF) data associated with detected signal pulses of the frequency hopping signal accumulated over time. The steps of the hop frequency prediction algorithm 500 are described hereinafter in conjunction with FIG. 7.

Figure 6:
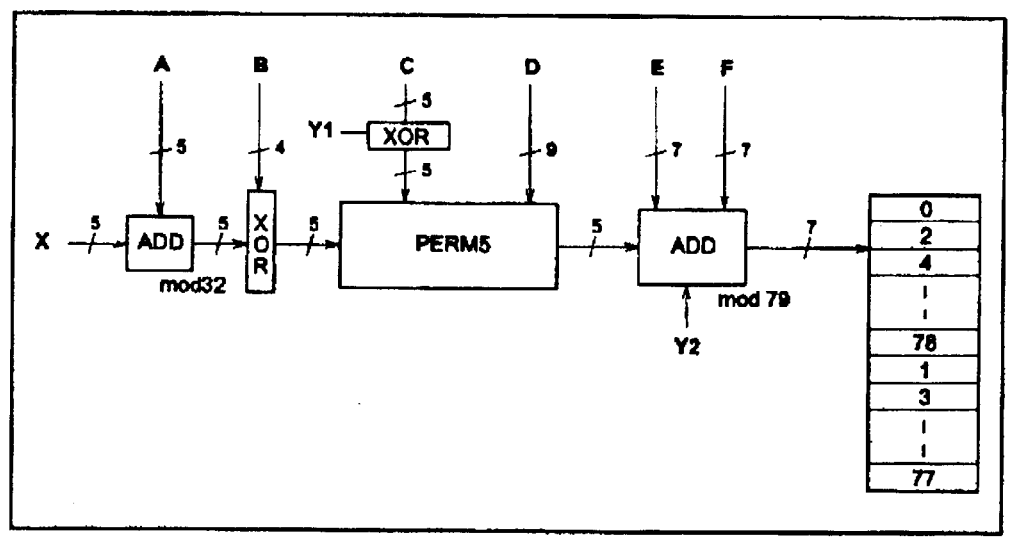
FIG. 6 is a block diagram that more specifically shows a pseudo-random frequency selection process used for a Bluetooth signal.

FIG. 6 illustrates the computations associated with the pseudo-random frequency selection process that is used for by the 79 hop frequency selection algorithm for Bluetooth signals. The selection bits X, A, B, C, D, E, F, Y1 and Y2 for the Bluetooth Connection state are defined below and are used in the computation blocks as shown in FIG. 6 to generate the hop frequency.

$X$(5 bits)=CLK[6:2]

$Y1$(5 bits)=31×CLK[1]

$Y2$(7 bits)=32×CLK[1]

$A$(5 bits)=ADR[27:23]XOR CLK[25:21]

$B$(4 bits)=ADR[22:19]

$C$(5 bits)=ADR[8,6,4,2,0]XOR CLK[20:16]

$D$(9 bits)=ADR[18:10]XOR CLK[15:7]

$E$(7 bits)=ADR[13,11,9,7,5,3,1]

$F$(7 bits)={16×CLK[27:7]}mod79

Further details of these bits can be found in the Bluetooth specification document, the entirety of which is incorporated herein by reference.

Although at first glance the Bluetooth pseudo random hop sequence looks like a complicated function of 55 input bits, and does not wrap for over 23 hours, it is in fact not a cryptographically strong function. As such, it can be derived much faster than it could using a brute force attack against the full "key space". A practical, real world cryptographic attack against the hop sequence generator is described below. If a device were to participate in the Bluetooth network, such information would be readily provided as part of the Bluetooth protocol, but this technique addresses a solution that does not require demodulation of Bluetooth traffic in order to recover data in a packet that indicates the state of the frequency hop selection sequence.

In fact, while some authors in the field have characterized time division multiple access (TDMA) and frequency hopping techniques as inherently having encryption type security, the fact is that the strength of the security of a communication protocol provided by the frequency hop techniques depends on the strength of the cryptographic functions that are used to generate the hop sequence. Many frequency hopping sequences, such as the one employed by the Bluetooth standard, do not use cryptographically strong functions and therefore may be cracked in order to determine future hop frequencies.

In the Bluetooth Connection state, the inputs to the hop sequence generator are 28 bits of an Address and 27 bits of a 1600 Hz Clock. These are used to calculate intermediate values X, Y1, Y2, and A through F in the Bluetooth specification. Since the clock wrap period is over 23 hours, and all bits are used to generate the hop sequence, a full solution would require pulses that cross this period. Besides the impracticality of such a long lock time, a mobile Bluetooth network might not be detectable for such a time period. A localized solution can be achieved with much fewer pulses, but which has a limited window of forward prediction. At the end of each such time window, a new solution will be synchronized with a binary exponentially increasing time window size.

Figure 7:
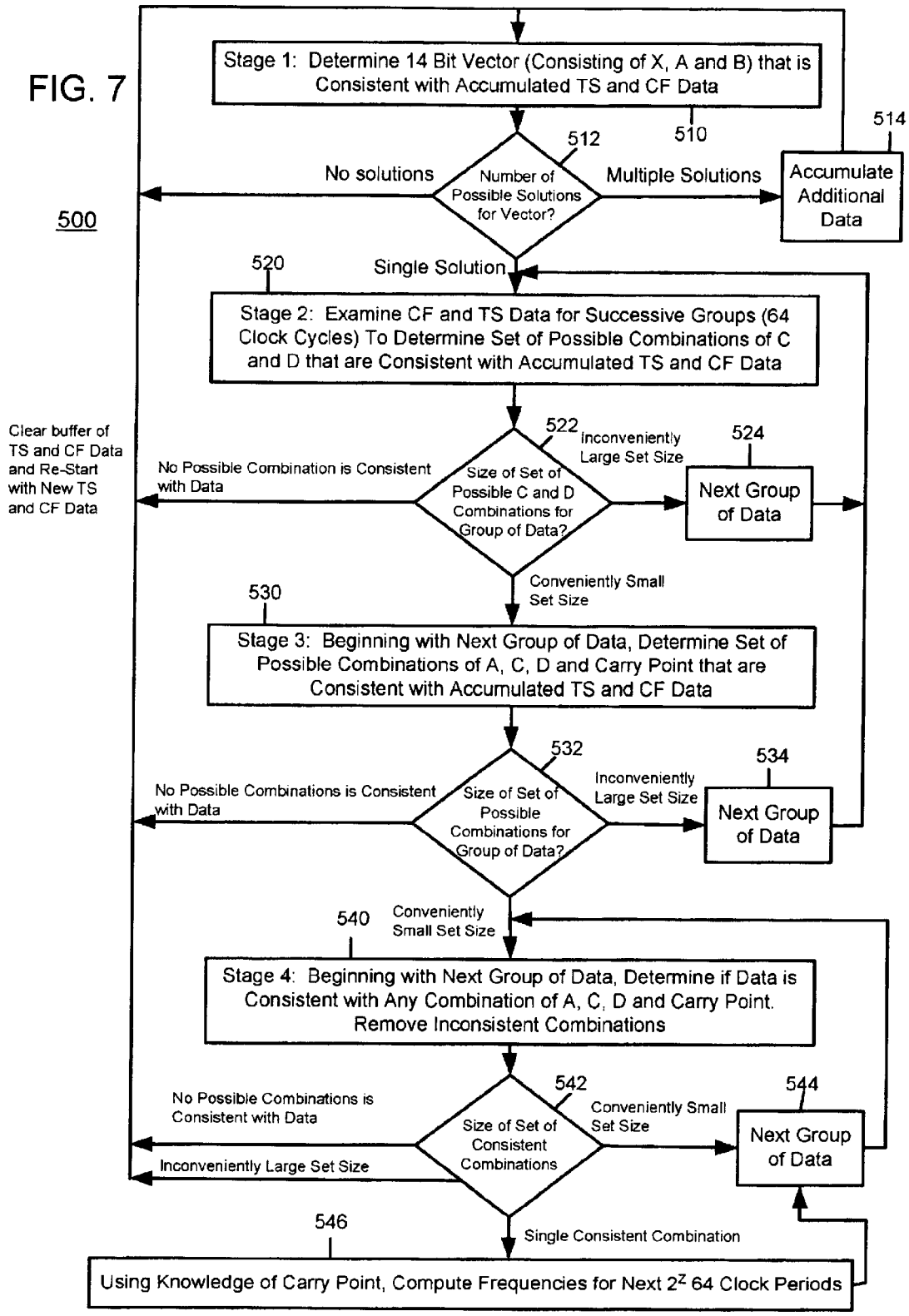
FIG. 7 is a flow chart showing a process for determining the future hop frequencies of a frequency hopping signal, such as a Bluetooth SCO signal.

Turning to FIG. 7, the hop frequency prediction algorithm 500 will be described. The algorithm comprises four Stages 510, 520, 530 and 540. Generally, the purpose of each Stage is to compute portions of the frequency selection bits, the input bits (or values that are intermediate mathematical functions of the frequency selection bits such as values A through F) from accumulated TS and CF data. The TS and CF data is accumulated from detected signal pulses of a type consistent with a frequency hopping protocol, e.g., Bluetooth, determined to be occurring. This algorithm is designed to determine future transmission frequencies of future transmissions of a frequency hopping signal, wherein the frequencies are selected by a pseudo-random mathematical process, such as the one used by the Bluetooth standard.

By way of illustration, the following description is directed to the frequency hopping signal being a Bluetooth SCO signal (such as used by a Bluetooth headset unit and base unit) utilizing a 79 hop count pattern (as used in the United States) that is in the Connection state. The device in which this frequency hop derivation/prediction algorithm is used may be an IEEE 802.11b (or g) STA or AP, or a computing device coupled thereto that manages a network of one or more APs by adjusting an operating parameter of such a network.

The noted aforementioned signal classification patent applications disclose mechanisms that can quickly classify and synchronize clocks with a Bluetooth interferer, and use this synchronization to improve transmit scheduling. Those classification processes may be used as the basis of enabling the following algorithm (and mitigation) when frequency hopping traffic, e.g., Bluetooth traffic is detected, and disabling the algorithm when the frequency hopping traffic has quiesced. In addition, the classification processes can filter the pulse data that needs to be analyzed by this algorithm to only those associated with a specific Bluetooth network's traffic, and to handle adjusting for clock drift over time. The classification processes will then provide as input to the algorithm the time of the pulse, TS, (converted to units of a local Bluetooth clock) and the center frequency of the pulse, CF (converted to a hop table index).

When this clock synchronization has occurred, avoiding a transmission that might collide reduces packet errors for both the 802.11 network and for the Bluetooth network, resulting in improved quality of service for both networks. The base Bluetooth transmit envelope is 366 $\mu s$ every 625 $\mu s$, or 59% of the bandwidth (although it is approximately 65% after allowing for clock drift and measurement inaccuracy). This is too much bandwidth to yield to an interferer, especially when not all such slots would have transmissions, or will be in the frequency channel(s) of interest or concern. Of this 65%, a 2 out of 6 puncture rate can be applied to account for Bluetooth SCO traffic, reducing the unusable bandwidth to 22%. During this time, not all of the hops would actually occur in the frequency channel of interest, such as a 20 MHz IEEE 802.11g channel. If the hop sequence could be predicted sufficiently in advance, this could further puncture the clock at approximately 21 out of 79 hops, reducing the unusable bandwidth to 6%. This final puncture rate could be enabled and disabled on the fly to follow the synchronization with the hop sequence generator. Such a conservative approach may be used to adjust operating parameters of a device, such as prohibiting transmissions that might collide with Bluetooth SCO traffic that is expected to be sent, at the expense of some degradation of available 802.11 bandwidth. Other non-SCO traffic for that Bluetooth network would not be protected, and might still collide.

The algorithm consists of four Stages that attack separate sections of the "key space". This algorithm is well suited to an embedded environment for several reasons: 1) Only a small amount of data needs to be stored and analyzed; 2) Processing of data can be limited to once every 40 ms; 3) CPU requirements are modest for modern processors, are primarily at specific synchronization points, and can be traded off against latency of synchronization. Alternatively, this algorithm could be run from a host driver in a host device coupled to STA or AP, where a larger memory and CPU footprint are acceptable, at the expense of further synchronization latency.

It is apparent from a cursory inspection of the hop sequence generator that in a period of 64 clocks (40 ms) that is aligned with the hop sequence generator, only the X, Y1, and Y2 fields will change and the intermediate values A through F would remain fixed. Consequently, 64 of the 79 channels will be visited, spreading the signal across 80% of the band. This spreading is a desired function that is explicitly called out in the Bluetooth specification. On average in each of these 64 clock cycles 19 out of 79 hops might be expected to be captured with a 20 MHz receive filter, or 15 pulses on average. If this is further limited to Bluetooth SCO traffic, this would only have traffic 2 out of every 6 times, or 5 pulses on average. Even allowing for some data loss keeping all pulses from being captured, this provides several pulses every 40 ms, and is unlikely to produce no pulses in such a period. This data may be held in a relatively small circular input cache or buffer, such as 128 entries, until it could be processed.

A false synchronization to a Bluetooth hop sequence is possible in various Stages of the algorithm. This might be induced by incorrectly identifying a pulse as belonging to a specific Bluetooth network, as may happen when multiple Bluetooth networks exist, or when similar interferers are present. It might also happen, due to some assumptions that are called out below to accelerate processing under the typical case. These false locks will be short lived with high probability, as each captured pulse would only have a 1 in 79 chance of being on the predicted frequency, and so would quickly prove to be inconsistent with prior data. When this occurs, the algorithm would simply reset to Stage 1 and quickly reacquire.

Generally, the algorithm derives future transmission frequencies by examining the CF and TS data accumulated over time for received transmissions of the frequency hopping signal, solving for a partial solution of inputs to the pseudo-random mathematical process or for related values (e.g., A through F) that are intermediate mathematical functions of the inputs, and using the partial solution or related values to compute (center) frequencies (and times) for transmissions of the frequency hopping signal for at least a portion, if not the entirety, of a future time interval. The step of solving involves determining a portion of a plurality of input bits or related values to the pseudo-random mathematical process (e.g., lower order Clock bits that form part of the plurality of bits), wherein said portion of the plurality of bits (the lower order Clock bits) or related values is determinative of the transmission frequencies of the frequency hopping signal for at least a portion of a limited period of time (the future time interval). The step of solving is repeated based on further accumulated data to determine additional portions of the plurality of bits or related values, thereby enabling computation of transmission frequencies of the frequency hopping signal for at least portions of additional future time intervals.

The steps of receiving radio transmissions of the frequency hopping signal, storing and accumulating TS and CF data and deriving hop frequencies for future transmissions may be performed in a first device (e.g., a STA or AP), and information (pertaining to frequencies and times for future transmissions of the frequency hopping signal) may be sent from the first device to a second device (e.g., an AP or STA) to enable the second device to adjust an operating parameter in order to mitigate interference with the frequency hopping signal. What makes this algorithm particularly useful is that it is performed (and the hop frequencies for future transmissions determined) without actually demodulating the frequency hopping signal and obtaining the state of the frequency hopping sequence from information carried in the frequency hopping signal. Therefore, it can be performed in a device that does not have the radio front-end or signal processing capability to demodulate and decode the communication protocol of the frequency hopping signal.

Stage 1

In Stage 1, the first simplification to reduce the search space is to ignore the 14 control bits (C and D) to the permutation (PERM5) function. Since the permutation is a butterfly function (as described in the Bluetooth specification), it results only in swapping of bit positions between the input and the output. There are 16,384 ($2^{14}$) combinations of control bit values that when applied by the PERM5 function produce 120 (5!) combinations of bit swapping. For a given 5 bit input value to the PERM5 function there is at most 5 possible output values that have the same number of bits set/clear. Instead of solving for the 14 control bits, the possible permutations are examined to determine if there exists a PERM5 output (1 of 5 possible outputs) that is consistent with the data.

The second simplification is to treat A as if it were a constant to be derived. Although the value of A is a function of the Clock, it will only change once every 10 minutes. Should synchronization in Stage 1 (or 2) be attempted when A is changing, a false lock or synchronization may be temporarily achieved, as described above. Such a false lock would be quickly detected, and would not be expected to repeat because the cycle time of such intervals is 10 minutes.

Similarly, the value F will change in a regular pattern up until its wrap point every 23 hours, and therefore can be treated as a constant. In fact, for practical purposes it is easier to allow a short loss of synchronization (and restarting of the algorithm) every 23 hours, rather than adding the complexity of handling this in later Stages.

The Y1 and Y2 values can be determined as part of the original classification of the interferer as Bluetooth SCO, and may be taken as input to the synchronization algorithm. Alternatively, an additional clock bit could be solved for in the Stage 1 vector, discussed below. Y1 and Y2 are each a function of the time of the Bluetooth pulses and are easily derived once the pulses are determined to be Bluetooth SCO traffic.

This leaves E and B as constants to derive. For a solution, a brute force attack is made against a 14 bit vector until only one value is consistent with the TS and CF data buffered from the detected Bluetooth pulses. This 14 bit vector consists of X (or the delta from the local clock for 5 bit positions), A (5 bits), and B (4 bits). In step 510, the search of the 16,384 ($2^{14}$) combinations associated with the 14 bit vector is made to determine if there is a PERM5 output such that a value of (E+F)mod79 (allowing for the expected carry from X into F) is consistent with the buffered CF and TS data.

If insufficient data is present in the buffer, then not all cases can be excluded and the search can be suspended and resumed when more data is available. This can be a single sequential search of the space that pauses, rather than requiring memory to store a list of possible values when trying to narrow it down. Once sufficient data is present, the Stage 1 14 bit vector will converge either to a single possible solution (and progress to Stage 2), or to no (0) solution. No solution indicates either a false classification of all data coming from a single Bluetooth network, or crossing a 10 minute wrap point. As such, the buffered data can be cleared, and the algorithm started over as shown by the decision step 512. If a single solution for the 14 bit vector exists, then the process continues to Stage 2, step 520. If multiple solutions for the 14 bit vector exist, then the process continues at step 514 to accumulate additional CF and TS data before resuming the analysis at step 510.

Stage 2

At this point, X, Y1, Y2, B, (E+F)mod79 are known, and A will be assumed not to wrap and therefore is also known.

According to the Bluetooth protocol, there are cycles of 64 clocks that occur every 40 ms. The TS and CF data stored for detected Bluetooth pulses for a 64 clock cycle were generated where X, Y1, and Y2 change in a known manner, and A through F remain fixed. In Stages 2 through 4, TS and CF data is processed for groups of pulses that are now known to belong to the same 64 clock cycle. Each group of data is used to study data points that do not have a carry into the upper bits (in Stage 2), and then how the clock carries into those upper bits (in later Stages).

In Stage 2, step 520, the 14 control bits of the permutation (C and D) are studied. Of the 16,384 combinations of C and D that produce one of 120 possible functions, only some are consistent with a single group of data and the known values that are derived in Stage 1. Although in Stage 2 the set of all possible combinations could be examined, as a means of memory optimization, the amount of data that needs to be stored for examination is limited. As depicted by steps 520, 522 and 524, each successive group of data is examined, until one produces a conveniently small set of possible combinations of C and D to be of interest. Preliminary testing has shown quick convergence to a set of no larger than 32 possible combinations, for example, of C and D that would be consistent with the data. When a conveniently small set of possible combinations has been identified for a group of data as shown in step 522, the algorithm proceeds to Stage 3. If no C and D combination is consistent with the data, then the buffer of data is reset and the algorithm restarted from Stage 1. On the other hand, if an inconveniently large set of combinations exists, then as shown in steps 522 and 524, data for the next group is processed. If memory requirements are not an issue and a large set of possible C and D combinations consistent with the data can be buffered, then step 522 may not be necessary and Stage 2 may proceed to Stage 3 without examining new groups of data.

Stage 3

Stage 3, step 530, attempts to determine the clock carry points into A, C, and D for each of the combinations obtained in Stage 2. As such, it requires data from the next 64 clock cycle after what was successfully determined in Stage 2, or else will transition back to Stage 2.

In binary, when a value is incremented, the bottom Z bits are inverted. This is because some number (0 or more) of the lower bits that were previously 1 will transition to 0 (1+1= 10) and produce a carry until the least significant 0 bit is reached and transitions to a 1 (0+1=1). The number of bits to invert is herein referred to as the carry point.

There are 19 possible carry points of interest for A, C, and D, which produce 19 cases (not $2^{19}$).

Since some carry must occur between successive 64 clock cycles, all the possible C and D combinations from Stage 2 for which carry points are consistent with the data are examined. For some combinations, no carry point may be consistent, and therefore may be discarded. For some combinations, only a single carry point is valid. Since only 120 functions are produced from the 16,384 combinations, it is also true that for some combinations multiple carry points may be consistent.

As depicted by steps 530, 532 and 534, the goal of Stage 3 is to produce a conveniently small set of possible combinations of A, C, D and carry point to take into Stage 4. If an inconveniently large number of combinations is still possible, the algorithm may cycle back to Stage 2, or if no combinations are possible, the buffer is reset and the algorithm restarts at Stage 1. Again, the need to reduce the number of possible combinations is a memory optimization issue, and may not be necessary if memory requirements are not a limiting factor.

Stage 4

In the final Stage, data is again processed a cycle at a time. Ideally there would be pulses from each successive cycle (which is likely), but having no data from some cycles can still be tolerated.

In steps 540, 542 and 544, the processing involves checking to confirm if the data from a cycle is consistent with the possible combinations of A, C, D and carry point. Inconsistent (A, C, D, and carry point) combinations can be removed, until only a single combination remains at which time computations of hop frequencies can be made because the carry point is now known. As depicted in step 546, knowledge of the carry point yields knowledge of a corresponding number of the lower clock (CLK) bits forward in time that are determinative of the frequencies (and times) of future transmissions for a future limited period of time. Specifically, knowledge of these bits defines a time period equal to $2^Z$ 64 clock time periods, where only the lower clock bits will change, and the pattern of changes are known for which the function (hop frequency) of the hop sequence generator may be computed for that (A, C, D, and carry point) combination. For example, if the carry point is 5, then it will be known how the lower order clock bits CLK[11:7] will change, and the remaining CLK and ADR bits input to the hop generator will not change for a time period of $2^5$ (32) 64 clock time periods, or 1.28 seconds. Therefore, the knowledge of these lower order clock bits is used to plug those values into the hop generator function to determine the hop frequencies (and corresponding time of occurrence) for each hop during this time period.

Continuing to examine the data for the next group beyond when a single consistent combination has been determined is useful for validation purposes until the next window of uncertainty. Should no consistent combinations remain (which happens with high probability for a false lock) the process can be restarted in Stage 1 as depicted in step 542. If a conveniently small set of consistent combinations remain, then the next group of data is processed as shown in step 544. It is unlikely, but possible, that an inconveniently large set of possible (A, C, D, and carry point) combinations (e.g., more than 32) might remain, and in such a case the algorithm may be reset to Stage 1. When multiple combinations exist at each successive carry point, then synchronization is temporarily lost until new data is accumulated and examined to quickly determine which was valid. At the point when the next unknown bit would be carried into, there will be some uncertainty and a need to determine which further carry points are consistent with the newly accumulated data, in which case steps 544, 540, 542 and 546 are repeated until the next carry point is determined.

While in Stage 4 the hop frequencies may be computed for the next $2^Z$ 64 clock time periods, it may be desirable to compute the hop frequencies for a shorter time window (less than $2^Z$ 64 clock time periods) in order to conserve computation and memory resources, depending on the hardware/software platform in which this algorithm is executed. Another advantage of computing the hop frequencies (and time of occurrences) for shorter time windows is to better account for clock drift (over time) between the frequency hopping signal and the device that is tracking it.

The foregoing frequency hop derivation algorithm may derive transmission frequencies of only certain ones (e.g., a subset) of possible future transmissions of the frequency hopping signal. For example, if a possible future time slot is known not to be exercised by devices operating according to the communication protocol that uses the frequency hopping sequence, then the algorithm may not compute the center frequency for that time slot. Furthermore, depending on the particular type of frequency hopping sequence, the solution for the inputs (or intermediate values related to the inputs) to the frequency hop sequence may yield transmission frequencies of the frequency hopping signal for only a portion or certain percentage of a future time interval (e.g., some number of 64 clock time periods). Further still, the solution that is derived for inputs (or related intermediate values) to the frequency hopping sequence may reduce a set of all possible transmissions frequencies for individual hops of the frequency hopping signal over at least a portion of the future time interval to a limited number of transmission frequencies. For example, the data accumulated for radio transmissions of the frequency hopping signal received over time is examined and at least a partial solution to inputs (or related intermediate values) of the frequency hop sequence are solved for such that the partial solution can only yield, e.g., 5 possible transmission frequencies, for any individual transmission (hop) that will occur during at least a portion of a future time interval. If any of these transmission frequencies fall within a particular frequency bandwidth (channel or channels), then a percentage or probability can be computed for an occurrence of the frequency hopping signal in the particular frequency bandwidth This percentage or probability can be used to decide whether, for a particular wireless application (e.g., IEEE 802.11 WLAN carrying a particular type of traffic such as voice over internet protocol traffic) action is taken to mitigate interference with the frequency hopping signal. As an example, the percentage or probability may be compared with a threshold as a decision trigger for determining whether to apply mitigation actions.

Figure 8:
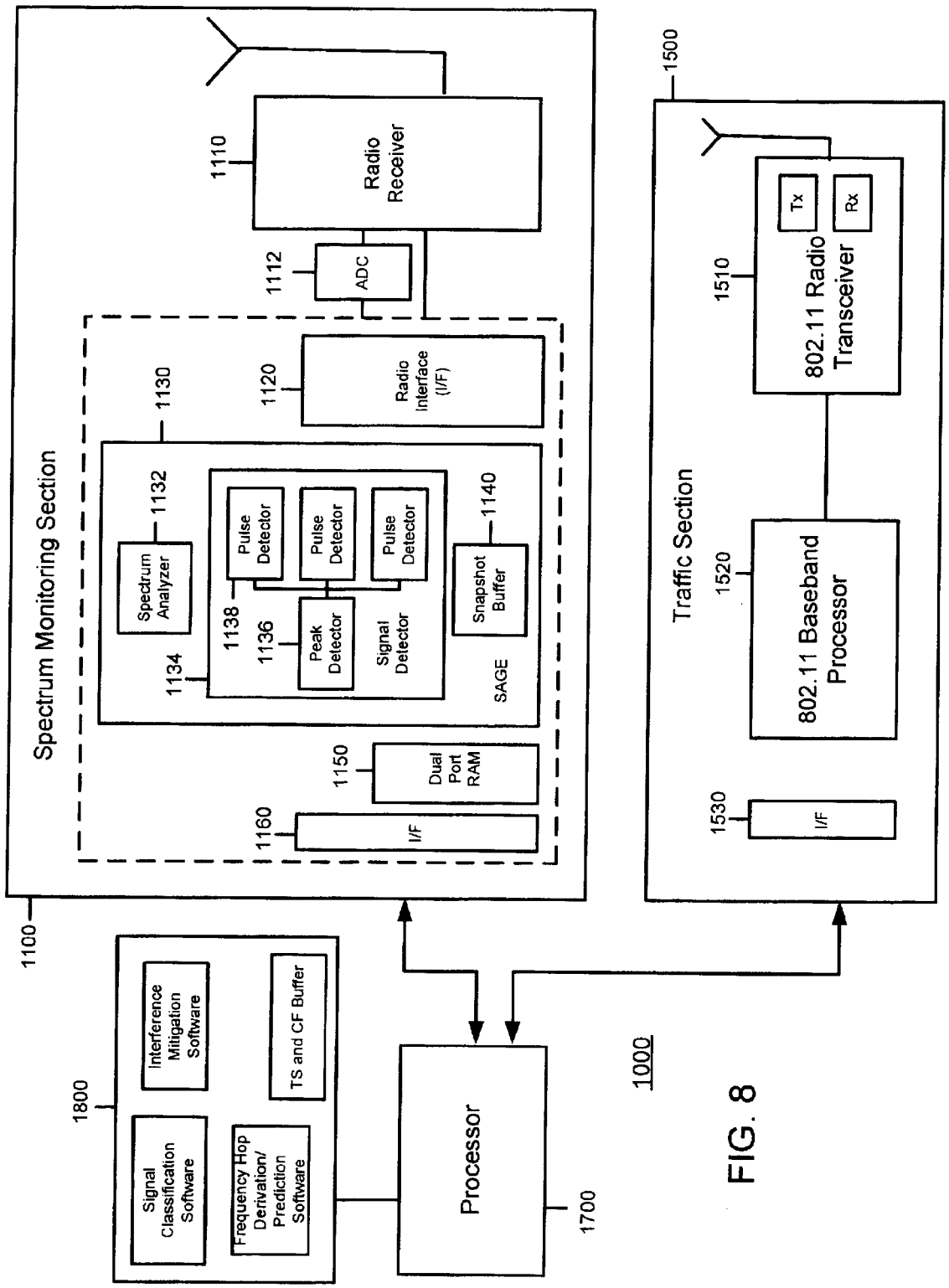
FIG. 8 is a block diagram of a device in which the frequency hop prediction process may be implemented.

Turning now to FIG. 8, a device is shown at reference numeral 1000 in which the hop prediction and interference avoidance procedures may be deployed. The device 1000 may be an 802.11 WLAN AP, STA or a specialized sensor device that does not necessarily carry 802.11 traffic, but monitors activity in the frequency band and on the WLAN. The device comprises a spectrum monitoring section 1100 to monitor RF activity in the frequency band and a traffic section 1500 that is capable of sending and receiving traffic according to a communication protocol, such as an IEEE 802.11 WLAN protocol. The spectrum monitoring section 1100 comprises a radio 1110 (primarily for receive operations) that is capable of tuning to receive energy at each channel (or simultaneously all channels in a wide-band mode) of, for example, any of the unlicensed bands (2.4 GHz and 5 GHz) in which IEEE 802.11 WLANs operate. An analog-to-digital converter (ADC) 1112 is coupled to the radio 1110 that converts the down converted signals from the radio 1100 to digital signals. A radio interface (I/F) 1120 is coupled directly to the radio 1110 and also to the output of the ADC 1112. A real-time spectrum analysis engine (SAGE) 1130 is coupled to the radio I/F 1120. The SAGE 1130 is thoroughly described in the co-pending and commonly assigned U.S. patent application Ser. No. 10/246,365, filed Sep. 18, 2002, and entitled "System and Method for Real-Time Spectrum Analysis in a Communication Device," and U.S. patent application Ser. No. 10/420,511, filed Apr. 22, 2003, and entitled "System and Method for Real-Time Spectrum Analysis in a Radio Device." The entirety of each of these applications is incorporated herein by reference. The SAGE 1120 includes a spectrum analyzer 1132, a signal detector 1134 consisting of a peak detector 1136 and one or more pulse detectors 1138, and a snapshot buffer 1140. A Fast Fourier Transform (FFT) block (not shown) is coupled between the I/F 1120 and the spectrum analyzer 1132, or included in the spectrum analyzer 1132. The SAGE 1130 generates spectrum activity information that is used to determine the types of signals occurring in the frequency band. A dual port random access memory (RAM) 1150 is coupled to receive the output of the SAGE 1130 and a processor I/F 1160 interfaces data output by the SAGE 1130 to a processor 1700, and couples configuration information from the processor 1700 to the SAGE 1130.

The functions of the SAGE 1130 will be briefly described in further detail hereinafter. The spectrum analyzer 1132 generates data representing a real-time spectrogram of a bandwidth of radio frequency (RF) spectrum, such as, for example, up to 100 MHz. The spectrum analyzer 1132 may be used to monitor all activity in a frequency band, for example, the 2.4–2.483 GHz ISM band, or the 5.15–5.35 GHz and 5.725–5.825 GHz UNII bands. The FFT block referred to above is, for example, a 256 frequency bin FFT block that provides (I and Q) FFT data for each of 256 frequency bins that span the bandwidth of frequency band of interest. A spectrum correction block may be included to correct for I and Q channel imbalance by estimating an I-Q channel imbalance parameter related to phase error and amplitude offset between the I and Q channels, and to suppress a side tone resulting from the RF down conversion process. The spectrum analyzer 1132 may further comprise a power computation block that computes $(FFTdataI)^2$ and $(FFTdataQ)^2$, respectively, and adds them together, to output a power value for each FFT frequency bin. The spectrum analyzer 1132 may further include a stats logic block that has logic to accumulate statistics for power, duty cycle, maximum power and a peaks histogram. Statistics are accumulated in the dual-port RAM over successive FFT time intervals. After a certain number of FFT intervals, determined by a configurable value stored in the spectrum analyzer control registers, an interrupt is generated to output the stats from the dual-port RAM. For example, the stats are maintained in the dual-port RAM 1150 for 10,000 FFT intervals before the processor reads out the values. The power versus frequency data generated by the spectrum analyzer 1132 is also used as input to the signal detector.

The signal detector 1134 detects signal pulses in the frequency band and outputs pulse event information entries, which include one or more of the start time, duration, power, center frequency and bandwidth of each pulse that satisfies configurable pulse characteristic criteria associated with a corresponding pulse detector. In the signal detector 1134, the peak detector 1136 looks for spectral peaks in the (power versus frequency data derived from FFT block output), and reports the bandwidth, center frequency and power for each detected peak. The output of the peak detector 1136 is one or more peaks and related information. The pulse detectors 1138 detect and characterize signal pulses based on input from the peak detector 1136. For example, one or more pulse detectors may be configured to detect pulses that match characteristic of the frequency hopping signal to be tracked, e.g., a Bluetooth signal. This would then supply an output stream of TS and CF for candidate pulses that are, after some further processing, used for accumulated TS and CF data for the hop derivation/prediction algorithm described above.

The snapshot buffer 1140 collects a set of raw digital signal samples useful for signal classification and other purposes.

The traffic monitoring section 1500 monitors packet activity in wireless network, e.g., a WLAN, and sends and receives certain packets that are used for location measurement processes. Included in the traffic monitoring section 1500 are a radio transceiver 1510 (comprising a transmitter Tx and a receiver Rx) and a baseband signal processor 1520. The radio transceiver 1510 and baseband signal processor 1520 may be part of a package chipset available on the market today, such as an 802.11 WLAN chipset for any one or more of the 802.11a/b/g or other WLAN communication standards. The baseband signal processor 1520 is capable of performing the baseband modulation, demodulation and other PHY layer functions compliant with the one or more communication standards of interest (e.g., IEEE 802.11a, b, g, etc.). An I/F 1530 couples the baseband signal processor 1520 and radio transceiver 1510 to the processor 1700.

The processor 1700 performs the various processing algorithms described herein on the output of the SAGE 1130 and on received packets from the traffic monitoring section 1500. The processor I/F 1160 of the spectrum monitoring section 1100 and the processor I/F 1530 of traffic monitoring section 1500 may be a Mini-PCI or PC-Card (e.g., Cardbus™) interface, or any other interface known in the art. While not shown in FIG. 8, there may also be a LAN interface block (e.g., Ethernet) that is coupled to the processor 1700 to enable connection with a wired LAN. The processor 1700 may generate signals to control the radio 1110 independently of the radio transceiver 1510, such that spectrum monitoring is occurring on one channel while protocol monitoring is simultaneously occurring on another channel, for example.

The processor 1700 can detect interference from a periodic signal source such as a Bluetooth headset, a cordless phone, etc., by examining traffic statistics gathered by the host communication device. For example, the processor may accumulate traffic statistics indicating how successful the device has been in transmitting to and receiving information from other devices according to the IEEE 802.11 protocol, employed by the device. Traffic statistics that may reveal the presence of an interferer are: (1) unexpectedly high packet errors (2) un-acknowledged messages; (2) repeated cyclic redundancy code (CRC) errors; (3) low received signal strength, etc. The degree of deviations from normal levels in any one or more of these statistics would be dependent on a specific wireless application.

The memory 1800 is used as a working memory for the processor 1700 and also stores a frequency hop derivation/prediction software program, signal classification software (if desired), interference mitigation software (to execute the scheduling of transmit packets in the future around expected hops of a frequency hopping signal in a channel(s) of concern). The processor 1700 executes the various software programs stored in the memory 1800. The memory 1800 also serves as a buffer for TS and CF data used by the hop prediction algorithm. The processor 1700 may employ features of any of the aforementioned co-pending and commonly assigned patent applications pertaining to signal classification in order to further process signal pulses that may be associated with a frequency hopping signal before adding TS and CF data to the buffer used by the frequency hop derivation/prediction algorithm.

The methods and techniques described in the foregoing description may be embodied by a processor readable medium storing instructions that, when executed by a processor, cause the processor to perform the various steps described above. For example, a processor readable medium may be provided that stores instructions, which, when executed by a processor, cause the processor to perform steps of: storing data pertaining to time of occurrence and center frequency for transmissions of the frequency hopping signal that have been received; and deriving, based on the data, future transmissions frequencies of the frequency hopping signal without obtaining state of a frequency hop sequence from information carried in the frequency hopping signal. The processor readable medium may store further instructions that, when executed by a processor, cause the processor to adjust an operating parameter of a communication device or network to mitigate interference with the frequency hopping signal.

Similarly, the hop derivation techniques may be applied to a method that executes the mitigation actions when interference with the frequency hopping signal is predicted to occur. Such a method for mitigating interference with a frequency hopping signal may comprise steps of: receiving radio transmissions of a frequency hopping signal; deriving future transmission frequencies and times of the frequency hopping signal without obtaining state of a frequency hop sequence from information carried in the frequency hopping signal; and adjusting an operating parameter of a communication device or network to mitigate interference with the frequency hopping signal using knowledge of future transmission frequencies and times of the frequency hopping signal.

The above description is intended by way of example only.

What is claimed is:

1. A method for determining future transmission frequencies of a frequency hopping signal comprising steps of:
   a. receiving radio transmissions of the frequency hopping signal;
   b. storing data pertaining to time of occurrence and center frequency for transmissions of the frequency hopping signal that have been received over time; and
   c. deriving, based on the data, future transmission frequencies of the frequency hopping signal without obtaining state of a frequency hop sequence from information carried in the frequency hopping signal.

2. The method of claim 1, wherein the step of receiving comprises receiving a subset of radio transmissions of the frequency hopping signal over time.

3. The method of claim 1, wherein the step of deriving comprises deriving transmission frequencies for a subset of possible future transmissions of the frequency hopping signal.

4. The method of claim 1, wherein steps (a) through (c) are performed in a first device, and further comprising the step of sending to a second device information to enable the second device to adjust an operating parameter to mitigate interference with the frequency hopping signal.

5. The method of claim 1, wherein the step of deriving comprises deriving future transmissions frequencies of the frequency hopping signal that are selected by the frequency hop sequence that uses a pseudo-random mathematical process.

6. The method of claim 5, wherein the step of deriving comprises steps of examining the data accumulated for radio transmissions of the frequency hopping signal received over time, solving for a partial solution of inputs to the pseudo-random mathematical process or for related values that are intermediate mathematical functions of the inputs, and using the partial solution or related values to compute transmission frequencies of the frequency hopping signal for at least a portion of a future time interval.

7. The method of claim 6, wherein the step of solving comprises solving for at least a partial solution to inputs or related values of the frequency hop sequence, and using the partial solution or related values to reduce a set of all possible transmissions frequencies for individual transmissions of the frequency hopping signal over at least a portion of the future time interval to a limited number of transmission frequencies.

8. The method of claim 6, wherein the step of receiving radio transmissions comprises receiving radio transmissions that are consistent with the Bluetooth communication standard.

9. The method of claim 6, wherein the step of solving comprises determining a portion of a plurality of input bits or related values thereof, wherein said portion of the plurality of input bits or related values thereof is determinative of transmission frequencies of the frequency hopping signal for at least a portion of the future time interval.

10. The method of claim 9, wherein the step of solving is repeated based on further accumulated data to determine additional portions of the plurality of bits or related values, thereby enabling computation of transmission frequencies of the frequency hopping signal for at least portions of additional future time intervals.

11. The method of claim 9, wherein the step of solving comprises determining values for lower order clock bits that are determinative of transmission frequencies of the frequency hopping signal for at least a portion of a limited period of time corresponding to the future time interval.

12. A method for mitigating interference with a frequency hopping signal, comprising steps of:
   a. receiving radio transmissions of a frequency hopping signal;
   b. deriving future transmission frequencies and times of the frequency hopping signal without obtaining state of a frequency hop sequence from information carried in the frequency hopping signal; and
   c. adjusting an operating parameter of a communication device or network to mitigate interference with the frequency hopping signal using knowledge of future transmission frequencies and times of the frequency hopping signal.

13. The method of claim 12, wherein the step of adjusting is performed at a first device for a signal that the first device transmits to the second device.

14. The method of claim 12, wherein the step of adjusting comprises adjusting a transmit time of a signal that the first device transmits to the second device so that a reply or acknowledgment signal transmitted by the second device to the first device does not interfere with the frequency hopping signal.

15. The method of claim 12, wherein the step of adjusting is performed at a first device for a signal that the first device broadcasts to a plurality of other devices.

16. The method of claim 12, wherein the step of adjusting comprises adjusting a parameter related to transmission of an IEEE 802.11 signal in a channel of a frequency band in which a future transmission of the frequency hopping signal may occur.

17. The method of claim 12, wherein the step of adjusting an operating parameter comprises adjusting one or more of: a time of transmission, a transmission frequency, a transmission data rate, a packet size for transmission, a transmission duration, a transmit power, a modulation scheme, and an encoding scheme.

18. The method of claim 17, wherein the step of adjusting a time of transmission comprises advancing or delaying the transmission.

19. The method of claim 12, wherein steps (a) and (b) are performed at a first device, and step (c) is performed at a second device.

20. The method of claim 19, and further comprising the step of sending information from the first device to the second device to enable the second device to perform the step of adjusting.

21. The method of claim 12, and further comprising the step of determining whether frequencies of possible future transmissions of the frequency hopping signal will occur within a particular frequency bandwidth.

22. The method of claim 21, wherein the step of adjusting an operating parameter is performed during a time interval when a future transmission of the frequency hopping signal may be expected to occur within the particular frequency bandwidth.

23. The method of claim 21, wherein the step of adjusting an operating parameter is performed during a time interval when a future transmission of the frequency hopping signal will be known to occur within the particular frequency bandwidth.

24. The method of claim 12, wherein the step of deriving comprises deriving future transmissions frequencies of the frequency hopping signal that are selected by the frequency hop sequence that uses a pseudo-random mathematical process.

25. The method of claim 24, wherein the step of deriving comprises steps of examining the data accumulated for radio transmissions of the frequency hopping signal received over time, solving for a partial solution of inputs to the pseudo-random mathematical process or for related values that are intermediate mathematical functions of the inputs, and using the partial solution or related values to compute transmission frequencies of the frequency hopping signal for at least a portion of a future time interval.

26. The method of claim 25, wherein the step of solving comprises solving for at least a partial solution to inputs or related values of the frequency hop sequence, and using the partial solution or related values to reduce a set of all possible transmissions frequencies for individual transmissions of the frequency hopping signal over at least a portion of the future time interval to a limited number of transmission frequencies.

27. The method of claim 25, wherein the step of receiving radio transmissions comprises receiving radio transmissions that are consistent with the Bluetooth communication standard.

28. The method of claim 25, wherein the step of solving comprises determining a portion of a plurality of input bits or related values thereof, wherein said portion of the plurality of input bits or related values thereof is determinative of transmission frequencies of the frequency hopping signal for at least a portion of the future time interval.

29. The method of claim 28, wherein the step of solving is repeated based on further accumulated data to determine additional portions of the plurality of bits or related values, thereby enabling computation of transmission frequencies of the frequency hopping signal for at least portions of additional future time intervals.

30. The method of claim 28, wherein the step of solving comprises determining values for lower order clock bits that are determinative of transmission frequencies of the frequency hopping signal for at least a portion of a limited period of time corresponding to the future time interval.

31. A processor readable medium storing instructions that, when executed by a processor, cause the processor to perform steps of:
   a. storing data pertaining to time of occurrence and center frequency for transmissions of the frequency hopping signal that have been received over time; and
   b. deriving, based on the data, future transmissions frequencies of the frequency hopping signal without obtaining state of a frequency hop sequence from information carried in the frequency hopping signal.

32. The processor readable medium of claim 31, wherein the instructions for performing the step of storing comprise instructions for storing data for a subset of radio transmissions of the frequency hopping signal received over time.

33. The processor readable medium of claim 31, wherein the instructions for performing the step of deriving comprise instructions for deriving transmission frequencies for a subset of possible future transmissions of the frequency hopping signal.

34. A radio device comprising the processor readable medium of claim 31, and further comprising a processor that executes the instructions stored on the processor readable medium, and a radio receiver that receives radio transmissions of the frequency hopping signal and outputs a receive signal from which is obtained the data pertaining to time of occurrence and center frequency of transmissions of the frequency hopping signal.

35. The processor readable medium of claim 31, and further comprising instructions, that when executed by the processor, cause the processor to adjust an operating parameter of a communication device or network to mitigate interference with the frequency hopping signal.

36. The processor readable medium of claim 35, wherein the instructions for performing the step adjusting comprise instructions for adjusting one or more of: a time of transmission, a transmission frequency, a transmission data rate, a packet size for transmission, a transmission duration, a transmit power, a modulation scheme, and an encoding scheme.

37. The processor readable medium of claim 35, and further comprising instructions stored on the medium, that when executed by the processor, cause the processor to perform a step of determining whether frequencies of possible future transmissions of the frequency hopping signal will occur within a particular frequency bandwidth.

38. The processor readable medium of claim 37, wherein the instructions for performing the step of adjusting are executed during a time interval when a future transmission of the frequency hopping signal may be expected occur within the particular frequency bandwidth.

39. The processor readable medium of claim 37, and further comprising instructions stored on the medium, that when executed by the processor cause the processor to execute the step of adjusting an operating parameter during a time interval when a future transmission of the frequency hopping signal will be known to occur within the particular frequency bandwidth.

40. The processor readable medium of claim 31, wherein the instructions for performing the step of deriving comprise instructions for deriving future transmission frequencies of the frequency hopping signal that are selected according to a pseudo-random mathematical process.

41. The processor readable medium of claim 40, wherein the instructions for performing the step of deriving comprise instructions for performing steps of examining the data accumulated for radio transmissions of the frequency hopping signal received over time, solving for a partial solution of inputs to the pseudo-random mathematical process or for related values that are intermediate mathematical functions of the inputs, and using the partial solution or related values to compute transmission frequencies of the frequency hopping signal for at least a portion of a future time interval.

42. The processor readable medium of claim 41, wherein the instructions for performing the step of solving comprise instructions for determining a portion of a plurality of input bits or related values thereof, wherein said portion of the plurality of input bits or related values thereof is determinative of transmission frequencies of the frequency hopping signal for at least a portion of the future time interval.

43. The processor readable medium of claim 41, and further comprising instructions for repeating the step of solving based on further accumulated data to determine additional portions of the plurality of bits or related values, thereby enabling computation of transmission frequencies of the frequency hopping signal for at least portions of additional future time intervals.

44. The processor readable medium of claim 41, wherein the instructions for performing the step of solving comprise instructions for determining values for lower order clock bits that are determinative of transmission frequencies of the frequency hopping signal for at least a portion of a limited period of time corresponding to the future time interval.

45. The processor readable medium of claim 41, wherein the instructions for performing the step of solving comprise instructions for solving for at least a partial solution to inputs or related values of the frequency hop sequence, and using the partial solution or related values to reduce a set of all possible transmissions frequencies for individual transmissions of the frequency hopping signal over at least a portion of the future time interval to a limited number of transmission frequencies.

* * * * *